United States Patent [19]
Purcell

[11] 3,924,703
[45] Dec. 9, 1975

[54] EQUALIZER BAR ASSEMBLY FOR CRAWLER-TYPE VEHICLES

[75] Inventor: Robert J. Purcell, Washington, Ill.

[73] Assignee: Caterpillar Tractor Co., Peoria, Ill.

[22] Filed: Nov. 8, 1974

[21] Appl. No.: 522,258

[52] U.S. Cl. .............................. 180/9.54; 280/112 R
[51] Int. Cl.² .......................................... B62D 55/08
[58] Field of Search ......... 180/9.5, 9.52, 9.54, 9.58, 180/9.6; 280/112 R, 112 A

[56] References Cited
UNITED STATES PATENTS

| | | | |
|---|---|---|---|
| 2,786,724 | 3/1957 | Armington | 180/9.5 |
| 3,383,118 | 5/1968 | Kolbe | 280/112 R |
| 3,554,576 | 1/1971 | Parker | 280/112 R |

*Primary Examiner*—Philip Goodman
*Assistant Examiner*—John A. Carroll
*Attorney, Agent, or Firm*—Ralph E. Walters

[57] ABSTRACT

An improved equalizer bar assembly for crawler-type vehicles. An elongated equalizer bar rockably supports the main frame of the vehicle and its ends pivotally engage track frames disposed on opposite sides of the vehicle frame. A pair of bracket-like structures depend from the main frame to positions below the equalizer bar adjacent each of the track frames and mount a resilient pad which also is in engagement with the underside of the equalizer bar.

5 Claims, 2 Drawing Figures

U.S. Patent  Dec. 9, 1975  3,924,703
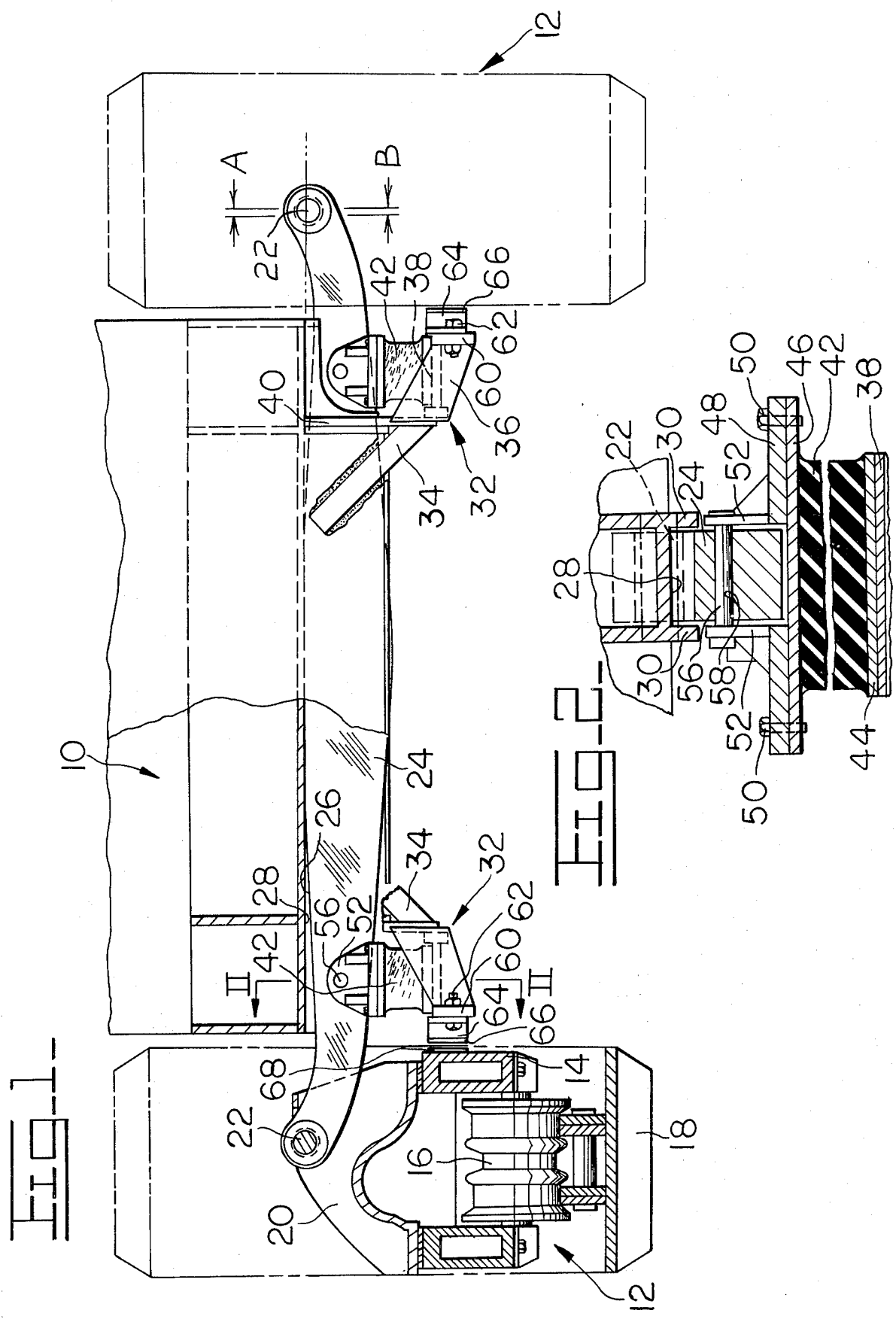

3,924,703

EQUALIZER BAR ASSEMBLY FOR CRAWLER-TYPE VEHICLES

BACKGROUND OF THE INVENTION

This invention relates to an equalizer bar assembly for a crawler-type vehicle.

The most pertinent prior art known to the applicant includes U.S. Pat. No. 1,890,975 to Erdahl; U.S. Pat. No. 2,705,175 to McIntyre; U.S. Pat. No. 2,978,050 to Risk et al.; U.S. Pat. No. 3,010,530 to Risk; U.S. Pat. No. 3,464,512 to Schaffner; and U.S. Pat. No. 3,759,541 to Peterson.

The severe operating environment of earth-working crawler-type tractors has resulted in the provision of various types of assemblies, commonly known as equalizer bar assemblies, to provide stability to the vehicles when they are operating in rough terrain and/or traversing the side of a hill.

In general, there are two types of equalizer bar assemblies. The first employs the use of a fixed pivotal connection to the main frame of the vehicle in line with the center line thereof. However, when the vehicle is operating on the side of the hill, there is a significant tendency of the main frame to roll about the pivot point giving a feeling of instability.

In the other type of equalizer bar, commonly known as a "rolling contact" type, tracks oscillate in passing over uneven terrain and the contact point between the equalizer bar and the main frame moves laterally so that the suspension axis of the main frame on the equalizer bar is moved toward the more elevated one of the tracks, providing an increased load on that track. However, the rolling contact type of bar has the disadvantage in that as the tractor operates on the side of a hill, the tractor main frame will tend to roll downhill on the equalizer bar. This tendency in some instances is restricted by a resiliently biased self-centering centrally located connection between the bar and tractor main frame. To prevent overstressing of the resilient means by the relatively high loads encountered necessitates the use of large stiff means that are often difficult to adapt.

SUMMARY OF THE INVENTION

It is the principal object of the invention to provide, in a crawler-type vehicle, a new and improved equalizer bar assembly. More specifically, it is an object of the invention to provide such a vehicle having an equalizer bar assembly wherein the weight of the main frame of the vehicle will be shifted toward the elevated or higher track without causing a significant tendency of the main frame to roll downhill on the equalizer bar to thereby provide a crawler-type tractor or a vehicle having a maximum stability and capability for operating in varying type of terrain.

The exemplary embodiment of the invention achieves the foregoing object in a crawler-type vehicle structure having a main frame disposed between a pair of track frames. An equalizer bar rockably supports the main frame and pivotally contacts both of the track frames. A pair of resilient means are provided and each is connected to the equalizer bar at the underside thereof adjacent a corresponding one of the track frames. Each of the resilient means is further connected to the main frame so that rocking movement of the equalizer bar relative to the main frame will cause one or the other of the resilient means to be compressed to thereby improve the stability of the vehicle.

According to a highly preferred embodiment, the equalizer bar has a convex upper surface engaging the underside of the main frame. Moreover, each of the resilient means is connected to the main frame by a bracket structure depending from the main frame. Each bracket structure has a bearing surface in sliding engagement with the respective one of the track frames to thereby limit lateral movement of the track frame relative to the main frame to maintain track alignment.

Further the pivot pin connection coupling the track frames to the outer ends of the equalizer bar are located at approximately the same level as the upper curvature of the bar. This provides substantially uniform inward movement of the track frames as they oscillate from their neutral position.

In a highly preferred embodiment, each of the resilient means comprises a pad with the pad being connected directly to both the main frame and the equalizer bar.

Other objects and advantages will become apparent from the following specification taken in connection with the accompanying drawings.

DESCRIPTION OF THE DRAWINGS

FIG. 1 is a fragmentary, front elevation of a crawler-type vehicle embodying the invention with parts broken away for clarity; and FIG. 2 is a vertical section taken approximately along the line 2—2 of FIG. 1.

DESCRIPTION OF THE PREFERRED EMBODIMENT

An exemplary embodiment of a crawler-type vehicle is illustrated in FIG. 1 and includes a main vehicle frame, generally designated 10, flanked by a pair of track frames, each generally designated 12. Each track frame 12 includes elongated rails 14 mounting a plurality of track roller assemblies 16 which, in turn, mount tracks 18 in the conventional fashion.

Each track frame 12 also includes additional mounting structure 20 which, by means of a pivot pin 22, is secured to a corresponding end of an elongated equalizer bar 24. The centers of pins 22 are placed approximately the same level as the upper curvature of bar 24 to assure uniform inward movement of the roller frames.

As can be seen in FIG. 1, the upper surface 26 of the equalizer bar 24 is somewhat convex and is in engagement with a flat portion 28 of the underside of the main frame 10. Consequently, it will be appreciated that the main frame 10 can rock on the equalizer bar 24 and during such rocking the point of contact of the main frame 10 with the equalizer bar 24 will move progressively toward the higher one of the track frames 12.

Depending downwardly from the underside of the main frame 10, and flanking the flat surface 28 is a pair of spaced guide plates 30, which extend transversely across the main frame to define, in conjunction with the flat surface 28, a downwardly opening channel for receipt of the equalizer bar 24. The guide plates 30, or any other suitable structure on the main frame 10, mount, in depending fashion, a bracket-like structure, generally designated 32, in adjacency to each of the track frames 12. Typically, a pair of spaced arms 34 will be provided and they, in turn, are secured to straddle-type brackets 36 each having a horizontally extending seat 38. If desired, suitable braces 40, also secured to the main frame 10, can be secured to the brackets 36.

Interposed between the seat 38 and the underside of the equalizer bar 24, adjacent both of the track frames 12, is a resilient cushion pad 42 formed of rubber or the like. The underside of the pad 42 mounts a metallic plate 44 which may be secured by any suitable means, such as bolts (not shown) to the seat 38. Similarly, the upper side of the pad 42 is bonded to a plate 46 which, in turn, is secured to a plate 48 by means of bolts 50.

The plate 48 includes a pair of upwardly extending ears 52 spaced so as to receive the equalizer bar 24. Aligned apertures (not shown) in the ears 52 receive a pivot pin 56 which extends through a bore 58 in the equalizer bar 24 so as to secure the pad 42 thereto.

Each bracket structure 32 includes a somewhat elongated flange 60 facing the innermost rail 14 of each track frame 12, and by means of any suitable fastener such as nuts and bolts 62 mounts a bearing block 64. Each bearing block 64 mounts a suitable hard metal plate 66 which is in substantial sliding emgagement with a similarly formed plate 68 secured to the inner surface of the inside track rail 14.

In operation, as the vehicle moves over terrain, the track frames 12 will oscillate and the equalizer bar 24 will respond by shifting its contact point in the cradle or channel defined by surface 28 and plates 30. Such shifting will move laterally outwardly toward one of the track frames in a direction toward the downhill one of the track frames relative to the underlying terrain in a progressive fashion. In other words, such track frame will pivot toward the main frame. As this occurs, the pad 42 adjacent the track frame that is uphill relative to the underlying terrain and pivoted away from the main frame will be compressed while the opposite pad 42 will be extended. By reason of their resilient nature, the pads will tend to restrain oscillation but not prevent it.

At the same time, the main frame 10 will have a tendency to roll on the equalizer bar 24 toward the downhill one of the track frames relative to the underlying terrain due to the influence of gravity. However, such rolling tendencies are offset by the fact that the pad 42 adjacent the uphill one of the track frames relative to the underlying terrain is progressively compressed to resist such rolling movement of the main frame. Of special significance is the fact that overstressing of such pad is virtually eliminated. For, as the pivot point moves downhill (relative to the terrain) on the equalizer bar 24, the effective length of the lever arm defined by the portion of the bar 24 extending from the pivot point to the point of connection to the pad 42 is increased. Thus, the resisting force, i.e., that internal force resisting compression of the pad 42 may take on a relatively low value because of the increased mechanical advantage produced by the increase in the effective length of the lever arm.

Moreover, provision of the bearing block 64 at the same time prevents lateral shifting of the track frames relative to the main frame thereby maintaining track alignment while further improving stability. It is to be noted that during normal oscillation of the bar 24, the track roller frames 14 will not contact the bearing blocks 64. In this respect, the clearance will be substantially the same at either the upper, or lowermost points of movement of a track frame relative to the main frame. When the location of the pivot pins is as mentioned previously, inward movement of the pivot pin center from the position illustrated in FIG. 1 will be the same for extreme positions of movement of the pivot pin 22 upwardly or downwardly. In FIG. 1, the maximum permitted inward movement during upward movement of the track frame is given a dimension A, while the corresponding maximum permitted inward movement for downward movement of the track frame is given dimension B. Thus, inward movement of the pins 22 is constant even though vertical movement thereof is unequal.

Thus, it will be appreciated that an equalizer bar assembly made according to the invention provides the advantage of shifting the weight of the tractor toward the elevated or higher one of the tracks while yet minimizing the tendency of the main frame to roll toward the downhill track to thereby improve stability. It will also be appreciated that by reason of the simple construction, the cushions or pads 42 may be easily serviced in the field. Similarly, the bearing block 64 may be easily removed and serviced when required.

I claim:

1. In a crawler-type vehicle having a main frame disposed between a pair of track frames and an equalizer bar rockably supporting said main frame and pivotally contacting both of said track frames, the improvement comprising a pair of resilient means, each connected to said equalizer bar at the underside thereof and adjacent corresponding ones of said track frames, said resilient means each further being connected to said main frame whereby rocking movement of said equalizer bar relative to said main frame will cause one or the other of said resilient means to be compressed to thereby improve the stability of the vehicle.

2. The crawler-type vehicle of claim 1 wherein one of said equalizer bar and said main frame has convex surface rollably engaging the other of said equalizer bar and said main frame.

3. The crawler-type vehicle of claim 1 wherein each said resilient means is connected to said main frame by a bracket structure depending from said main frame, each said bracket structure having a bearing surface adapted for sliding engagement with a respective one of said track frames to thereby limit lateral movement of said track frames relative to said main frame to maintain track alignment.

4. The crawler-type vehicle of claim 1 wherein each said resilient means comprises a pad, each said pad being connected to said main frame by a bracket structure depending from said frame and seating the associated pad at a location below said equalizer bar.

5. The crawler-type vehicle of claim 1 wherein opposite ends of said equalizer bar include pivots pivotally connected to respective ones of said track frames, said pivots being substantially in the same plane as an uppermost surface of said equalizer bar.

* * * * *